No. 626,164.  
I. HOGELAND.  
MATCH MAKING MACHINE.  
(Application filed Feb. 16, 1897. Renewed Nov. 3, 1898.)  
Patented May 30, 1899.
(No Model.)  
3 Sheets—Sheet 1.
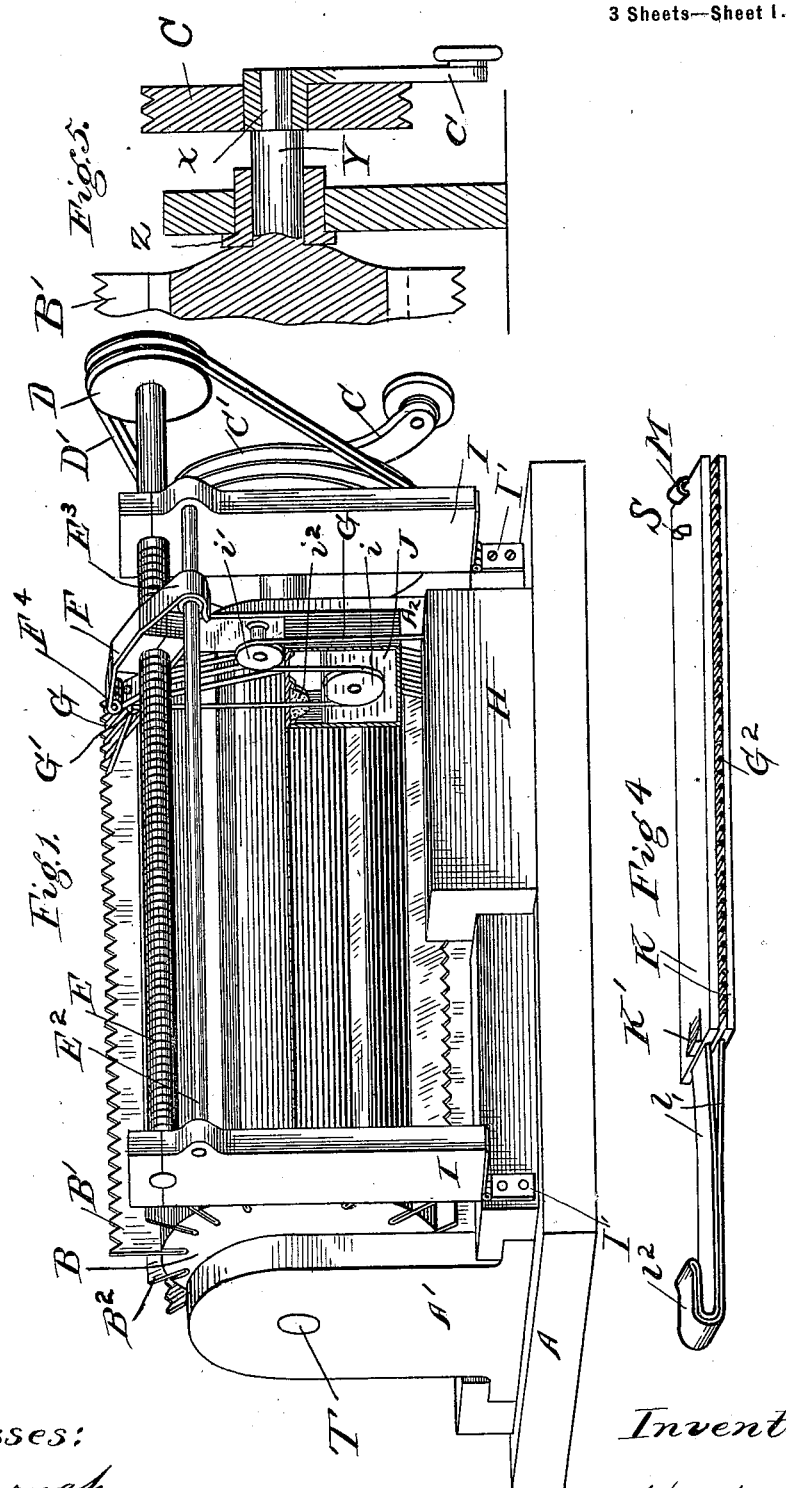
Witnesses:  
Inventor:

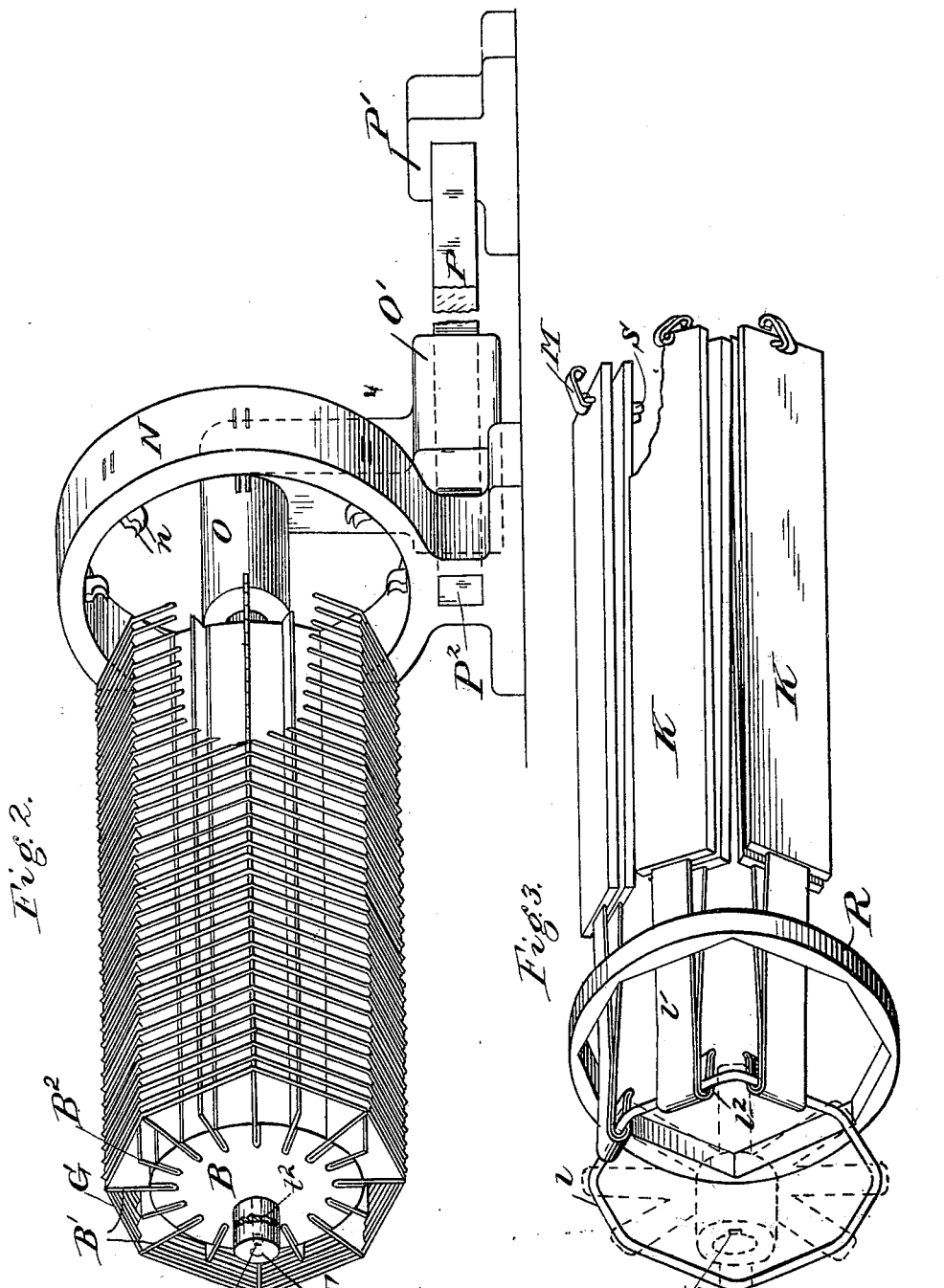

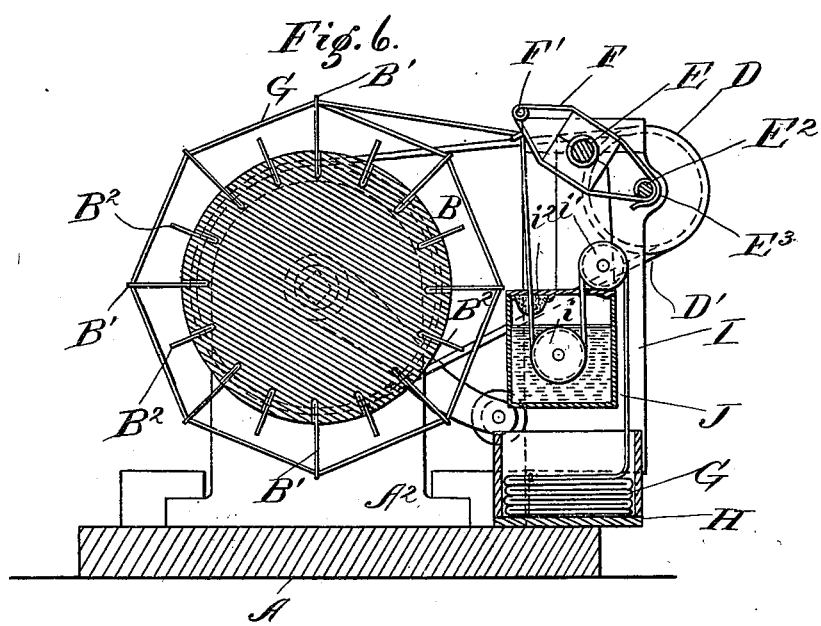

UNITED STATES PATENT OFFICE.

ISRAEL HOGELAND, OF CHICAGO, ILLINOIS.

MATCH-MAKING MACHINE.

SPECIFICATION forming part of Letters Patent No. 626,164, dated May 30, 1899.

Application filed February 16, 1897. Renewed November 3, 1898. Serial No. 695,414. (No model.)

*To all whom it may concern:*

Be it known that I, ISRAEL HOGELAND, a citizen of the United States, residing at Chicago, in the county of Cook and State of Illinois, have invented certain new and useful Improvements in Matches and Machines for Making the Same, of which the following is a specification.

My object is to provide machinery of novel construction which shall adapt it for the manufacture in large numbers without great expense for labor and within a comparatively short space of time of match-stems made of paper or of any other suitable fibrous material reduced to the form of twine or cord by winding the twine or cord and stiffening it, clamping sections of the wound material in suitable holders, and severing it into match-stems of proper length confined in the holders ready to be dipped at one end to "head" them into the usual or any suitable material or composition that ignites by friction and which is hereinafter referred to as the "composition."

Referring to the accompanying drawings, Figure 1 is a perspective view of the machine; Fig. 2, a similar view, partly broken, showing the reel with twine wound upon it and the cutting mechanism; Fig. 3, a similar view showing the clamping-holder mechanism for the match-stems; Fig. 4, a similar view of one of the clamping-holders filled with the match-stems ready to be dipped in the composition; Fig. 5, a broken view, in vertical sectional elevation, showing the connection of the crank with the reel for turning it; and Fig. 6, a transverse vertical section through the machine as shown in Fig. 1, taken to one side of the hinged frame carrying the divided nut.

A is the base, from opposite ends of which rise the uprights A' and $A^2$, in which is journaled the reel B, the body of which may be a solid cylinder. The base and uprights thus afford one form of support for the reel. At equal intervals apart, corresponding or approximately corresponding with the predetermined length of the match-stems, there are formed in the reel-body to extend lengthwise thereof slots, into which are inserted blades B', having their outer edges serrated. Between each pair of the blades B' there may also be provided, though not necessarily, blades $B^2$, let into the reel-body like the serrated blades, but narrower or shallower than the latter and without serrations in their outer edges. The blades $B^2$ serve as guides in the adjustment in place of the clamping-holders, hereinafter described. At one side of the reel-body, near its opposite ends, are provided the uprights I I, hinged at their lower ends, as shown at I', to the base A and affording near their upper ends bearings for a rotary threaded rod E, carrying on one end the grooved pulley D. On the journal Y of the reel-body, which passes through a thimble Z in the bearing $A^2$, is mounted, at the flattened end $x$ of the journal, a crank C, carrying a grooved pulley C', larger than the pulley D, with which it is geared through the medium of the cords D'. On the threaded rod E is supported a divided nut F, confined in a strap-frame formed of two members hinged together at one end at $F^4$ and clasped over each other at $E^3$ on a guide-rod $E^2$, extending between the uprights I I, to steady the nut in the operation of the machine. The threaded rod and traveling nut thereon constitute a species of traveling feed to the reel of the twine to be wound thereon.

On the base A, at one side of the machine, is a box H for containing a supply of twine, that used by me being by preference twisted tissue-paper. The twine is shown at G in Fig. 1 as passing from the box upward over a guide-pulley $i'$ and thence down under a similar pulley $i$, both pulleys being carried by a box J, depending from the nut F, to travel with it and containing the supply of sizing or stiffening liquid, which may be shellac or any other suitable material. Whatever the stiffening material employed, however, it should be adequately combustible. From the pulley $i$ the twine passes through a wiping-sponge $i^2$, supported in the upper portion of the box J, and through an eyelet G' on the hinged end of the nut-frame, which guides the twine to the reel, upon which the end of the twine should be preliminarily fastened and passed into a notch of one of the serrated blades B'. By then turning the crank C the reel is rotated, as also the screw E, which causes the nut F and box J, with its contents, to travel, thereby regularly winding tautly upon the reel and spirally between the teeth on the respective blades B' the shellac-coated twine, which is then left to dry after being severed from the ball and the severed end being suitably fastened on the reel.

A reel B wound in the manner described is shown in Fig. 2 adjusted in a twine-severing adjunct to the winding mechanism. This severing device comprises a ring N, carrying cutters $n$ on its inner surface at points to straddle the blades B' and rising from a suitable stable base, in which is a bearing $P^2$ for one end of a bar P, having its other end supported in a bearing P'. On the bar P is supported to slide thereon a head O', from the face of the upright portion of which there extends horizontally the tubular bearing O.

After the twine on the reel has dried, or before, if desired, the reel is taken out of its bearings in the uprights A' and $A^2$ by withdrawing the former, which, as will be seen by inspection of Fig. 1, has lateral tongues at its lower end, at which it engages with grooves in the base A to permit the upright to be adjusted in place by sliding and to be removed in the same way. The reel is then adjusted at its journal Y and supported thereon in the bearing O to be in readiness to be drawn through the ring N by sliding the bearing O' on the bar P to pass the blades B' between the cutters $n$, and thereby sever the twine after clamping it.

Clamping-holders K are applied lengthwise of the reel-body between the serrated blades B' to embrace there transversely the lengths of the twine and hold them while they are being severed into the match-stem lengths. A set of these clamping-holders is shown in Fig. 3, and they are constructed and applied as follows:

Each clamping-holder K comprises two jaws formed of corresponding rectangular flat strips, which may be of wood and the width of which should be less than the predetermined length of the match-stems. These jaws are connected together at one end by spring-arms $l'$, formed into a hook $l^2$ at their extremity and which tend to cause the jaws to separate toward the opposite end, where the outer one carries a pivotal catch M, adapted to be hooked over the end of the under jaw to hold them temporarily together. An angular ring $l$, supported on spokes extending from a hub, as shown by the dotted representation on Fig. 3, and corresponding in angularity with the angles formed by the blades B' on the reel, is applied to the journal F of the reel-body B by slipping the hub thereon in a manner to cause the feather $t$ on the journal to coincide with a groove $t'$ in the hub. The clamping-holders K are then applied one at a time to the reel by slipping the jaws between a pair of the blades B' to embrace the lengths of twine extending between them, and in thus adjusting the clamping-holder it is engaged at its hook $l^2$ with the ring $l$. When all the clamping-holders have been adjusted in position, a ring R, having an angular internal surface corresponding with that presented by the cross-section of the clamping-holders, is applied to encircle the latter and is slid upon the reel toward the spreading ends of the holder-jaws to force those of each holder together, when they may readily be secured in their condition of gripping between them the twine lengths by adjusting the catch M, after which the ring R is to be withdrawn. In placing each of the clamping-holders K in position it is guided by a blade $B^2$, with which a bifurcated lug S on the lower jaw engages, and a lug K' on the surface at the rear end of the lower jaw tends to force it by engagement with the edge of a blade $B^2$ up tightly against the twine lengths. Thereupon the reel is drawn through the ring N to effect severance by the cutters $n$ of the twine lengths between the blades B' into match-stems $G^2$, Fig. 4.

Severing the twine lengths from the reel leaves each holder K separate to serve as a medium for dipping the projecting ends of the stems into the composition to head them, after which the holder may be laid aside till the composition has dried, when the catches M are loosened to permit the finished matches to be taken out of the holders and packed.

The foregoing description sets forth the construction of my improved machinery in all its details as shown in the drawings. These details may in various particulars be modified and some of them may be entirely omitted without departure from my invention. Hence I do not wish to be understood as intending to limit my invention to such details of construction, except in such of the appended claims as the intention so to do is made manifest by the terms thereof. Obviously the cutting adjunct shown and described is not a necessary feature of my invention, since the twine on the reel may be cut by other means, such as a knife manipulated by the hand of the operator.

What I claim as new, and desire to secure by Letters Patent, is—

1. In a machine for making match-stems, substantially as described, the combination with a suitable support of a reel journaled in said support and comprising a body carrying serrated blades extending radially from and lengthwise of said body at intervals thereon determining the length of said stems, and a traveling holder for the stiffening material, through which the match-stem material is passed to the reel, substantially as set forth.

2. In a machine for making match-stems, substantially as described, the combination with a suitable support of a reel journaled in said support and comprising a body carrying serrated blades extending radially from and lengthwise of said body at intervals thereon determining the length of said stems, and a traveling holder for the stiffening material, through which the match-stem material is passed to the reel, and a traveling feed for controlling the winding on the reel of the twine forming the match-stem material, substantially as set forth.

3. In a machine for making match-stems, substantially as described, the combination with a suitable support of a reel journaled in said support and comprising a body carrying serrated blades extending radially from and lengthwise of said body at intervals thereon determining the length of said stems, a rotary threaded rod extending parallel with and geared to said reel, a nut on said rod and a holder for the stiffening material connected with said nut to travel with it and through which is passed to the reel the twine, forming the match-stem material, substantially as set forth.

4. In a machine for making match-stems, substantially as described, the combination with a suitable support of a reel journaled in said support and comprising a body carrying serrated blades extending radially from and lengthwise of said body at intervals thereon determining the length of said stems, a rotary threaded rod extending parallel with and geared to said reel, a divided nut on said rod confined in a two-part frame hinged together at one end and provided with a hook at its opposite end, a guide-rod extending parallel with said threaded rod and engaged by said hook, and a holder for the stiffening material connected with said nut to travel with it and through which is passed to the reel the twine forming the match-stem material, substantially as set forth.

5. In a machine for making match-stems, substantially as described, the combination with a base A carrying the uprights A' and A², of a reel B journaled in said uprights and comprising a body carrying serrated blades B' at intervals thereon determining the length of said stems, a rotatory threaded rod E journaled in uprights I hinged to said base and a rod E² extending between said uprights, said threaded rod being geared to said reel, a divided nut F on said threaded rod confined in a frame F⁴ having an eyelet and a hook E³ engaging said rod E², a holder J suspended from said nut to travel with it and carrying the guide-pulleys $i$ and $i'$, and a box H for the ball of twine forming the match-stem material passing about said pulleys through said eyelet to the reel, substantially as set forth.

6. In a machine for making match-stems, substantially as described, the combination with a suitable support of a reel journaled in said support and comprising a body carrying serrated blades extending radially from and lengthwise of said body at intervals thereon determining the length of said stems, and a clamping-holder adjustable to extend between a pair of said blades and grip between its jaws the lengths of twine forming the match-stem material wound upon said reel, substantially as and for the purpose set forth.

7. In a machine for making match-stems, substantially as described, the combination with a suitable support of a reel journaled in said support and comprising a body carrying serrated blades B' at intervals thereon determining the length of said stems, and clamping-holders K to extend between said blades, each of said holders comprising a pair of jaws having a spring $l'$ at one end and a catch M at the opposite end, substantially as and for the purpose set forth.

8. In a machine for making match-stems, substantially as described, the combination with a suitable support of a reel journaled in said support and comprising a body carrying serrated blades B' at intervals thereon determining the length of said stems, and intermediate blades B², and clamping-holders K to extend between said serrated blades, each of said holders comprising a pair of jaws having a spring $l$ at one end, a catch M at the opposite end, and a guide-lug S and a raising-lug K' on the lower jaw, substantially as and for the purpose set forth.

9. In a machine for making match-stems, substantially as described, the combination with a suitable support of a reel journaled in said support and comprising a body carrying serrated blades B' at intervals thereon determining the length of said stems, a ring $l$ surrounding a hub fitting one of the journals of said reel, clamping-holders K to extend between said serrated blades, each of said holders comprising a pair of jaws having a hooked spring at one end, at which it engages said ring, and a catch M at the opposite end, and a ring R for encircling said holders about the reel, substantially as and for the purpose set forth.

10. In a machine for making match-stems, substantially as described, the combination of a reel B comprising a body carrying serrated blades B' at intervals thereon determining the length of said stems, clamping-holders K adjustable to extend between said blades, and a severing device for twine wound upon said reel, comprising a stationary ring N carrying cutters $n$ to engage the twine along said blades, a bar P supported at its opposite ends in bearings, and a head O' supported to slide on said bar and carrying a bearing O for a journal end of said reel, the whole being constructed and arranged to operate substantially as set forth.

11. In a machine for making match-stems, the combination with a body provided at intervals with projections, of means for applying thereto a length or lengths of match-stem material, a series of independent portable clamping devices adapted to be applied to the match-stem material between the projections, and means for severing the match-stem material at opposite sides of the respective clamping devices; whereby the clamping devices with the match-stem lengths may be handled independently or jointly for dipping.

12. In a machine for making match-stems, the combination with a body provided at intervals with projections, of means for winding thereon a continuous length of match-stem material, a series of independent portable clamps adapted to be applied to the match-stem material extending between the projections, and means for severing the match-stem material at opposite sides of the clamps while on the body; whereby the clamps with the match-stem lengths may be handled independently or jointly for dipping.

ISRAEL HOGELAND.

Witnesses:
   E. R. MEARS,
   T. BROUGHAM BAKER.